United States Patent
Healey et al.

(10) Patent No.: US 8,730,987 B2
(45) Date of Patent: May 20, 2014

(54) FRAMING OF ANALOG COMMUNICATION (75) Inventors: Peter Healey, Ipswich (GB); Yu R Zhou, Ipswich (GB); David B Payne, Ipswich (GB); Russell P Davey, Otley (GB); Andrew D Wallace, Harlow (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 937 days.

(21) Appl. No.: 12/303,439

(22) PCT Filed: Jun. 4, 2007

(86) PCT No.: PCT/GB2007/002056
§ 371 (c)(1),
(2), (4) Date: Dec. 4, 2008

(87) PCT Pub. No.: WO2007/141508
PCT Pub. Date: Dec. 13, 2007

(65) Prior Publication Data
US 2009/0262759 A1    Oct. 22, 2009

(30) Foreign Application Priority Data

Jun. 9, 2006  (EP) .................................... 06253000
Oct. 31, 2006  (GB) .................................. 0621674.1

(51) Int. Cl.
*H04J 4/00*  (2006.01)
*H04J 3/06*  (2006.01)
*H04J 3/07*  (2006.01)

(52) U.S. Cl.
USPC ............ 370/436; 370/503; 370/505; 370/520

(58) Field of Classification Search
USPC .......................................................... 370/503
See application file for complete search history.

(56) References Cited

U.S. PATENT DOCUMENTS

| 3,201,777 A | | 8/1965 | Brown | |
|---|---|---|---|---|
| 4,473,901 A | * | 9/1984 | Jensen | ........................ 370/520 |

(Continued)

FOREIGN PATENT DOCUMENTS

| DE | 42 23 175 | 1/1994 |
|---|---|---|
| FR | 2 718 307 | 10/1995 |

(Continued)

OTHER PUBLICATIONS

International Search Report for PCT/GB2007/002056, mailed Sep. 25, 2007.

(Continued)

*Primary Examiner* — Brandon Renner
(74) *Attorney, Agent, or Firm* — Nixon & Vanderhye P.C.

(57) ABSTRACT

The present invention relates to communication, in particular to communication involving analogue-like signals that are multiplexed together. There is provided a method of communicating with a plurality of devices, each of which of which provides a signal whose amplitude varies in an analogue fashion, the method including the steps of: temporally interleaving the signals from the devices so as to form a multiplexed signal having a plurality of sequential pulses, which pulses can, in an analogue fashion, each have an amplitude within a continuous range, each pulse originating from a respective device, and each pulse having a plurality of temporal portions; and, forming a synchronisation signal within the multiplexed signal for demultiplexing the multiplexed signal, the synchronisation signal being formed by reducing the amplitude within a temporal portion of at least some of the pulses.

14 Claims, 9 Drawing Sheets

(56) References Cited

U.S. PATENT DOCUMENTS

| | | | |
|---|---|---|---|
| 5,062,105 A * | 10/1991 | McKnight et al. | 370/538 |
| 5,666,366 A * | 9/1997 | Malek et al. | 370/505 |
| 6,014,175 A | 1/2000 | Hallman et al. | |
| 6,144,695 A * | 11/2000 | Helms et al. | 375/222 |
| 6,459,684 B1 | 10/2002 | Conroy et al. | |
| 2006/0140631 A1 | 6/2006 | Brolin | |

FOREIGN PATENT DOCUMENTS

| | | |
|---|---|---|
| JP | 60-009253 | 1/1985 |
| JP | 61-035636 | 2/1986 |

OTHER PUBLICATIONS

UK Search Report dated Feb. 16, 2007 in GB0621674.1.
Written Opinion of the International Searching Authority in PCT/BG2007/002056.
Examination Report Mailed Jun. 21, 2010 in European Application No. 07 733 071.0 (4 pages).
International Preliminary Report on Patentability Issued Dec. 10, 2008 in PCT Application No. PCT/GB2007/002056 (8 pages).

* cited by examiner

Note, There are (N-1) clock alignment pulses at the PLL input per frame, i.e. a pulse density of (N-1)/N.

Fig.8.
1B2B Bi-phase sampled PAM: System diagram 1

Fig.9.
1B2B Bi-phase sampled PAM transmitter: Central Source

Encoder:
X = 01 when D = 0
X = 10 when D = 1

Fig.12.
1B2B Bi-phase sampled PAM: System diagram 3

FRAMING OF ANALOG COMMUNICATION

This application is the U.S. national phase of International Application No. PCT/GB2007/002056 filed 4 Jun. 2007 which designated the U.S. and claims priority to EP 06253000.1, filed 9 Jun. 2006 and GB 0621674.1, filed 31 Oct. 31, 2008 the entire contents of each of which are hereby incorporated by reference.

The present invention relates to communication, in particular to communication involving analogue-like signals that are multiplexed together.

In recent years, particularly with increasing use of the internet, there has been interest in providing higher data rates to users. One objective of developments in this area, in countries with a heavy historical investment on copper access networks, has been to make use of existing twisted-pair telephone lines. A result of this has been the Asymmetrical Digital Subscriber Line (ADSL) approach in which it was found that an existing copper pair from a telephone exchange or central office to a telephone subscriber's premises could, using suitable modulation techniques, support significant downstream data rates, of the order of 1.5 Mbit/s. However the actual rate obtained in practice depends on the quality and length of the path from the exchange An alternative proposal, providing higher data rates, is to make use of the copper pair only from some point rather closer to the user, normally from the an intermediate node or cabinet connected to the exchange by an optical link. This is sometimes referred to as a "fibre to the cabinet" arrangement, and is used with very high speed Digital Subscriber Line (VDSL) technology or other Digital Subscriber Line technologies, which are generally referred to as "xDSL".

In one type of "fibre to the cabinet" arrangement, a broadband service is provided from the exchange by a multiplexer/demultiplexer which multiplexes signals, using ATM or SDH techniques, onto one or more optical fibres which feed the cabinet. Within the cabinet there is provided (for each fibre) an ATM or SDH demultiplexer, and at least one DSL access multiplexer (DSLAM) for providing, on the basis of the demultiplexed ATM or SDH signals, xDSL-modulated signals suitable for travelling over the copper pairs, which ultimately lead the subscriber premises. The or each xDSL modem is connected via filters to the copper pairs so that the xDSL signals can be carried over a different frequency range to that of the telephony signals, without the telephony signals and the xDSL affecting one another. A power supply is normally provided in the cabinet to supply power to the various optical/electrical components.

This approach however can require a costly installation. To reduce costs, it has been suggested to provide xDSL modulator equipment at the exchange or other location feeding the exchange, such that the xDSL-modulated signals can be transmitted from the exchange (using for example discrete multitone modulation, or carrierless amplitude/phase modulation or other known xDSL modulation techniques rather than SDH or ATM). Such an approach reduces the need for a DSL modulator to be provided at the cabinet.

According to one aspect of the invention, there is provided a method of communicating with a plurality of devices, each of which is to receive a signal whose amplitude varies in an analogue fashion, the method including the steps of: temporally interleaving the signals for the respective devices so as to form a multiplexed signal having a plurality of sequential pulses, which pulses can, in an analogue fashion, each take an amplitude value within a continuous range; and, forming a synchronisation signal within the multiplexed signal for subsequently demultiplexing the multiplexed signal, the synchronisation signal being formed by reducing the amplitude within a temporal portion of at least some of the pulses.

The multiplexed signal containing respective pulses for the devices can then be carried over a common carrier, such as a common optical waveguide. The synchronisation signal can be used to demultiplex the signal, and associate each pulse with the device for which it is intended. Because the amplitude within a temporal portion of at least some of the pulses is reduced, the step height before or after a pulse is likely to be increased, resulting in a strong clock signal which can be used for synchronisation.

Preferably, before the synchronisation signal is formed or embedded in the multiplexed signal, the sequential pulses adjoin one another such that (when data is present of each of the devices) there are no significant gabs between neighbouring pulses. That is, if there is a decrease in signal strength between pulses, the decrease will preferably be sufficiently small and of sufficiently short duration for it to have only an insignificant influence, if any, on the required signal processing.

The levels of the synchronisation signal will preferably be within the range of the multiplexed signal; that is, the amplitude of the synchronisation signal will preferably not exceed the amplitude of the multiplexed signal. In one way to achieve this, the synchronisation signal will preferably be formed within the multiplexed signal by modulating one of the synchronisation signal and the multiplexed signal with the other of the of the synchronisation signal and the multiplexed signal, thereby effectively multiplying the two signals together. This will allow the resulting signal to have a wide range of output signal levels.

Since the devices may send traffic in addition or alternatively to receiving traffic, there is provided, in a further aspect of the invention, a method of communicating with a plurality of devices, each of which of which provides a signal whose amplitude varies in an analogue fashion, the method including the steps of: temporally interleaving the signals from the devices so as to form a multiplexed signal having a plurality of sequential pulses, which pulses can, in an analogue fashion, each have an amplitude within a continuous range, each pulse originating from a respective device, and each pulse having a plurality of temporal portions; and, forming a synchronisation signal within the multiplexed signal for demultiplexing the multiplexed signal, the synchronisation signal being formed by reducing the amplitude within a temporal portion of at least some of the pulses.

Further aspects of the invention are provided in the appended claims. Some embodiments of the invention will now be described, by way of example, with reference to the accompanying drawings, in which:

Figure 1:
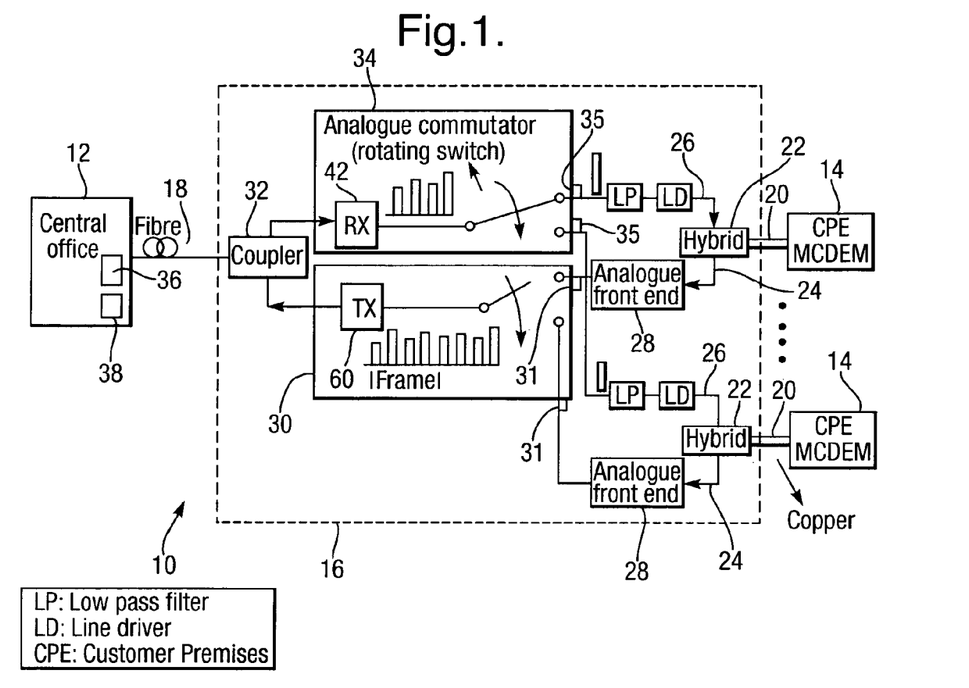
FIG. 1 shows a communication system according to the present invention.

FIG. 1 shows a communications system 10 suitable for Digital Subscriber Line (DSL) communication, in which a central office or exchange 12 communicates with a plurality of customer modems 14 (Customer Promises Equipment or CPE). To reach the customer modems 14, the central office 12 is connected to an intermediate node or cabinet 16 by an optical link, here an optical fibre 18. From the cabinet 16, there extends a plurality of electrical links, in the form of copper pairs 20, each of which is connected to a respective customer modem 14. Typically, the cabinet will be located in a street, whereas each customer modem 14 will be located within the premises of the customer.

For each customer modem 14, there is provided a hybrid device 22, here a passive transformer device, which separates traffic in the cabinet into an upstream path 24 for traffic travelling towards the central office 12, and a downstream path 26 for traffic travelling from the central office 12, traffic along the copper pairs being duplex. The downstream path includes a low pass filter (LP) and a line driver (LD) whereas the upstream path includes an analogue front end pre-amplifier 28.

To multiplex the upstream signals from the different customer modems 14 there is provided a Pulse Amplitude Modulator (PAM) transmitter 30, having a plurality of inputs 31, each one of which is connected to the upstream path from the respective customer modem 14. Signals from the PAM transmitter 30 are output in the optical domain to a coupler 32, for transmission upstream over the fibre 18.

Likewise, to demulitplex downstream signals from the central office 12, so that the different signals can be transmitted to the different customer modems 14, there is provided, at the cabinet, a PAM receiver 34 with a plurality of outputs 35, each output being connected to a downstream path 26 for transmission to a respective customer modem. At the central office 12, there is provided a corresponding PAM transmitter and receiver 36,38 for respectively multiplexing and demulitplexing signals transmitted and received over the optical fibre 18.

Figure 2:
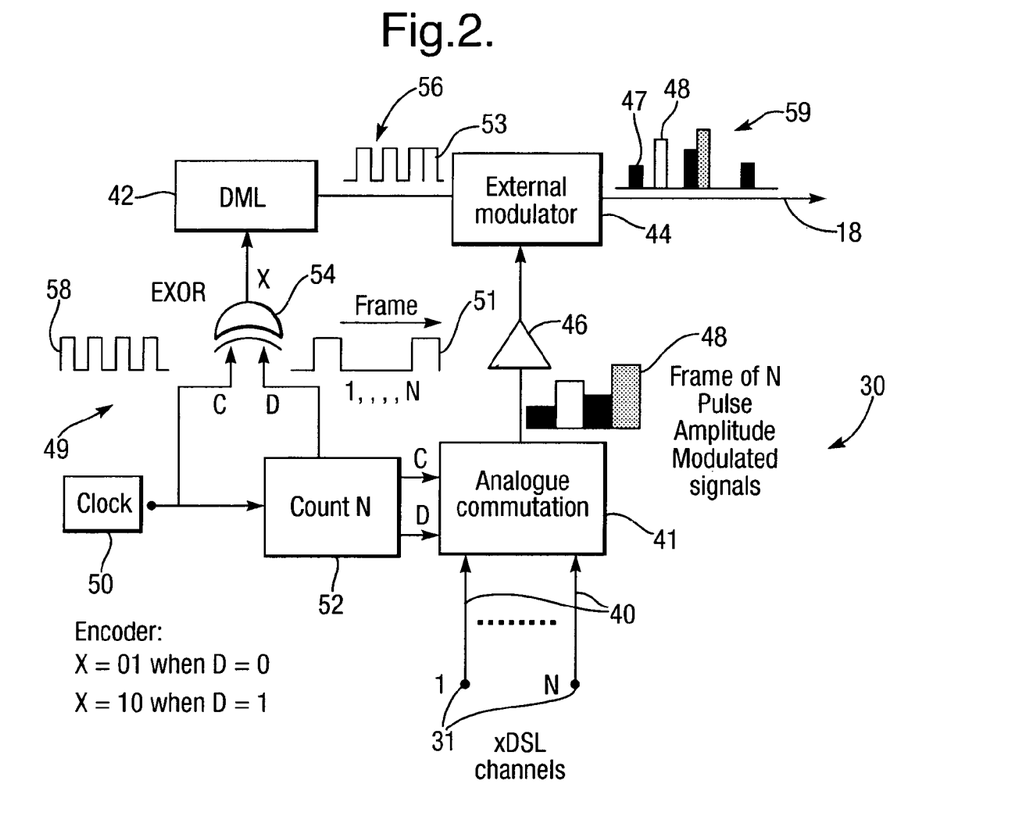
FIG. 2 shows in more detail a multiplexing arrangement of FIG. 1.

An example of a suitable PAM transmitter 30 is shown in FIG. 2. A laser 42 is provided for generating optical signals, which signals are modulated by an external modulator 44 before being transmitted over the optical fibre 18. The PAM transmitter includes an analogue commutator 41, also known as a rotating switch or a commutator switch, which receives signals from the different customer modems 14 at respective inputs 31, the signals at each input forming a respective channel 40.

In this architecture, the analogue commutator samples each channel and interleaves the samples sequentially so as to provide an aggregate electronic signal having the form of a sequence of analogue pulses, each pulse originating from a given customer modem 14. Each pulse had a temporal width governed by the sampling frequency of the commutator. The aggregate signal is arranged as a sequence of frames 48 (only one of which is shown in FIG. 2). Where there are N customer modems, each fame contains N pulses which succeed one another in the manner of a Time Division Multiplexed (TDM) signal, the N pulses being associated with N channels such that each of N customer modem has a given channel. Clearly, a frame need not be formed simply N sequential pulses, and may be arranged in another cyclic structure.

However, in contrast to a conventional TDM signal, the amplitude of a given pulse (which represents the amplitude of the electronic signal from the sampled customer modem 14 at the sampling instant) is not quantized (at least not to a material extent). The analogue-like nature of the pulses is due to the DSL modulation process at a given customer modem. This will normally result in a signal formed from the superposition of a large number of substantially uncorrelated but quantized signals (i.e., signals having one or more properties whose values such as amplitude or phase are discrete). Thus, the signal from a customer modem will have a continuous range of values, like an analogue signal, despite the fact that it carries digital information. The amplitude of a given pulse will correspond to the amplitude of the analogue signal during the sampling period of the pulse (although a commutator is used, which provides a windowed version of the signal, a sample and hold circuit could be used instead).

The aggregate electronic signal from the analogue commutator is used (after being amplified by an amplifier 46) to drive the external modulator 44, such that the optical signal from the laser will have amplitude-modulated thereon the aggregate signal from the commutator 41. Thus, the N sequential analogue pulses of each frame are modulated onto a common optical wavelength.

In order to synchronise the commutator 41 at the cabinet and to allow the PAM receiver 38 at the central office to synchronise with the PAM transmitter at the cabinet, a synchronisation circuit 49 is provided. The synchronisation circuit 49 includes a clock source 50 which generates clock formed as a stream of clock pulses 58. The clock signal is passed to a counter 52, which is triggered on the rising edge of the clock pulses and is configured to: (i) generate timing signals (C) at the clock rate (e.g., by simply forwarding the clock pulses); and (ii), every Nth clock pulse, provide a re-set signal (D). The timing signals are used by the commutator 41 to switch from one channel 40 to the next in a cyclic fashion, the re-set signal D indicating the start of the cycle. Here, the re-set signal is in the form of a pulse 51 with the same temporal width as the analogue pulses.

To allow the PAM receiver 38 to synchronise to the signals transmitted from the PAM transmitter 30 and thereby demultiplex the aggregate signal, the synchronisation circuit 49 is configured to include a synchronisation signal in the aggregate signal. To achieve this, the clock signal is passed to one input of an exclusive OR gate (EXOR gate) 54. At another input of the EXOR gate, there is provided the re-set signal (D) from the counter 52. When the re-set signal is not present, that is, in the intervals between the re-set pulses 51, the EXOR gate simply outputs the clock signal unchanged. However, when the clock signal temporally coincides with a re-set pulse (which is twice the width of a clock pulse), the pulse is inverted or shifted by a phase of 180 degrees. This results in the inverted pulse and the next, non-inverted, pulse being continuous so as to form a single pulse 53 of twice the width of the clock pulses. In this way, the re-set signal is embedded in the synchronisation signal. The EXOR gate effectively combines the clock signal and the re-set signal so as to provide a synchronisation signal 56, the re-set signal acting as a frame synchronisation signal for the upstream PAM receiver 38 by indicating to the receiver the beginning of a frame (or a predetermined position within the frame).

The output of the EXOR gate is used to directly modulate the output of the laser 42, such that the laser output is amplitude modulated with the synchronisation signal 56. The aggregate signal from the customer modems 14 is then modulated over the synchronisation signal and transmitted as a composite signal 59 over the optical fibre 18. The effect of embedding the synchronisation signal into the aggregate signal is to introduce gaps 47 between the signal pulses 48, whose widths is now reduced as compared to the original width. Although in this example an external modulator is used, the synchronisation signal could be embedded or combined in the electrical domain with the data signal, the combined signal being used to drive the laser.

The manner in which the synchronisation signal is formed is known as 1B2B encoding, since each bit or signal pulse width (determined by the bit rate of the clock 50) is encoded with 2 bits. However, other schemes involving 1BnB encoding where n22 2 may be used, although such schemes may not carry the clock information as effectively as the 1B2B scheme.

It should be noted that the clock pulses 58 do not occur over the full width of the signal pulses. In this example, the mark-space ratio is 50:50, although the mark space ratio could be a different number. As a result, even when the synchronisation signal (which is a binary signal consisting of "1" and "0" values) is a "0", the data pulse will still be present, albeit with a reduced width. The signal pulses can thus be regarded as each being temporally divided into: a modulation portion, which is removed by the synchronisation signal when the synchronisation signal is a "0"; and, a signal portion, which is left unchanged when the synchronisation signal is a "1". By removing a portion of each pulse in a regular fashion (that is, because the temporal width of the removed portion is the substantially the same for each pulse), the transition between pulses is enhanced, since the magnitude of a given transition will equal to the height of a pulse rather than the difference in the heights of successive pulses. Clearly, the pulse need not be entirely be removed in the synchronisation portion, although entirely removing the pulse in the synchronisation portion will give rise to the strongest transition. Furthermore, it is clear that the temporal division within a given pulse before being modulated by the synchronisation signal is conceptual in that the division is not apparent from an inspection of the pulse itself; that is, the pulse amplitude will be constant or will vary slowly throughout its width.

The signal portion of each pulse need not be at the same position within a each pulse. In the example of FIG. 2, the reset signal is provided by removing the trailing portion of a pulse rather than the leading portion. That is, the position of the signal portion within a given pulse carries synchronisation information, in the present example frame synchronisation information. Furthermore, a given pulse may have a plurality of signal portions.

From the above discussion, it can be seen that the synchronisation signal is embedded in the data signal. This is effectively achieved by (a) time-slicing each pulse into a plurality of slices and removing the signal from a chosen slice so as to provided a strong clock signal; and, (b), altering the position of the removed slice within a pulse so as to provided frame information (preferably in a regular manner if the frames are regular).

Figure 3:
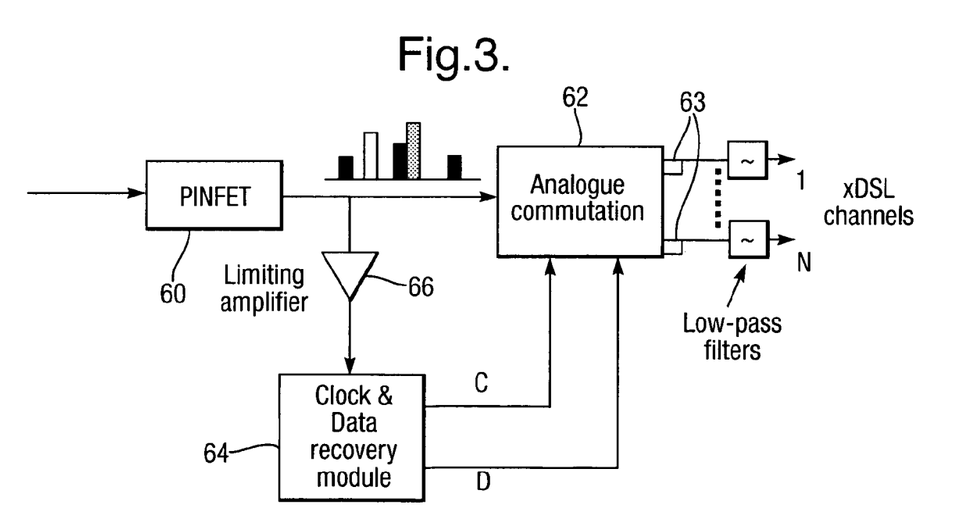
FIG. 3 shows in more detail a demultiplexing arrangement of FIG. 1.

FIG. 3 shows in more detail a PAM receiver. The PAM receiver has a photo-receiver (also known as a photo detector) 60, here a PIN FET for converting the composite signal received over the optical fibre 18 into an electrical signal which is fed to a synchronised commutator switch 62 for demultiplexing the signal into the N channels from which it is formed. The composite signal is also fed to a clock and data recovery module 64 (via a limiting amplifier 66) in order to recover the synchronisation signal from the composite signal. In particular, the clock and data recovery module 64 is configured to recover the clock signal (C) and the frame synchronisation signal (the re-set signal D) from the synchronisation signal, and pass the clock signal and the frame synchronisation signal to the commutator switch 62. The commutator switch has plurality of outputs 63, one for each respective channel. In response to the clock signal, the commutator switch 62 is configured to change the output 63 from which the composite signal is output, such that the composite is output from each of the output sequentially, in a round-robin or cyclic fashion, the frame synchronisation signal causing the commutator switch 62 to re-start the cycle.

Figure 4:
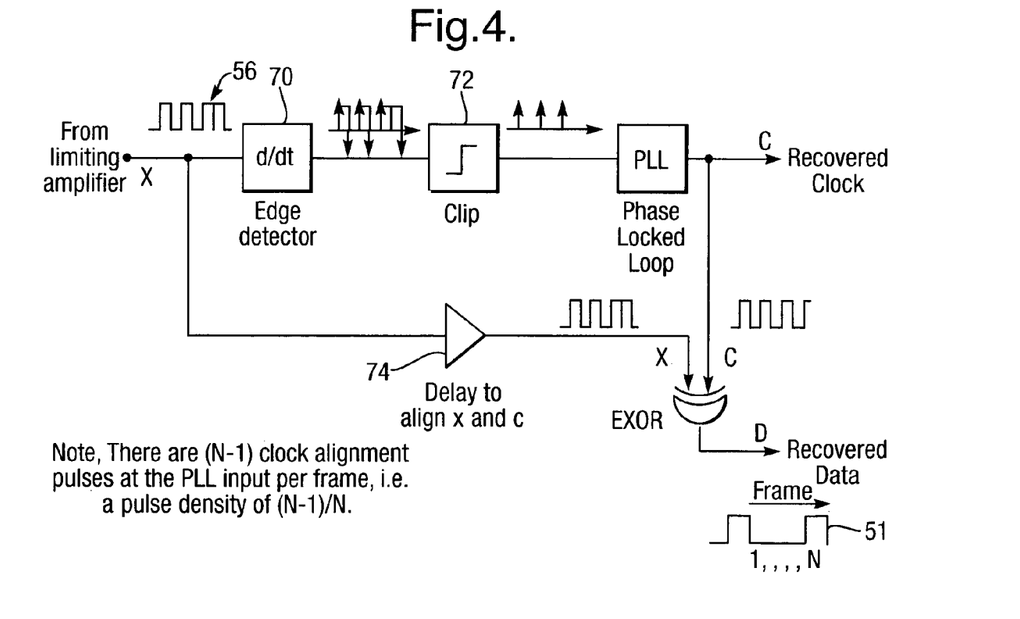
FIG. 4 shows in a clock and data recover circuit of FIG. 3.

The clock and data recovery (CDR) module 64 is shown in more detail in FIG. 4. The limiting amplifier 66 feeding the CDR module effectively recovers the synchronisation signal 56, which is passed to an edge detector 70 and subsequently to a clip circuit 72 which provides a signal corresponding to each upward transition of the synchronisation signal 56. The signal from the clip circuit 72 is used to drive a phase locked loop (PLL) which in turn provides a clock signal (C) which passed to an input of an EXOR gate. The synchronisation signal (X), suitably delayed by a delay stage 74, is passed to the other input of the EXOR gate, the delay being chosen so as to align the two signals input at the EXOR gate. The operation of the EXOR gate results in the re-set signal 51 (used as a frame synchronisation signal) being recovered at the output of the EXOR gate (the clock signal (C) being recovered by the phase locked loop.

Figure 5:
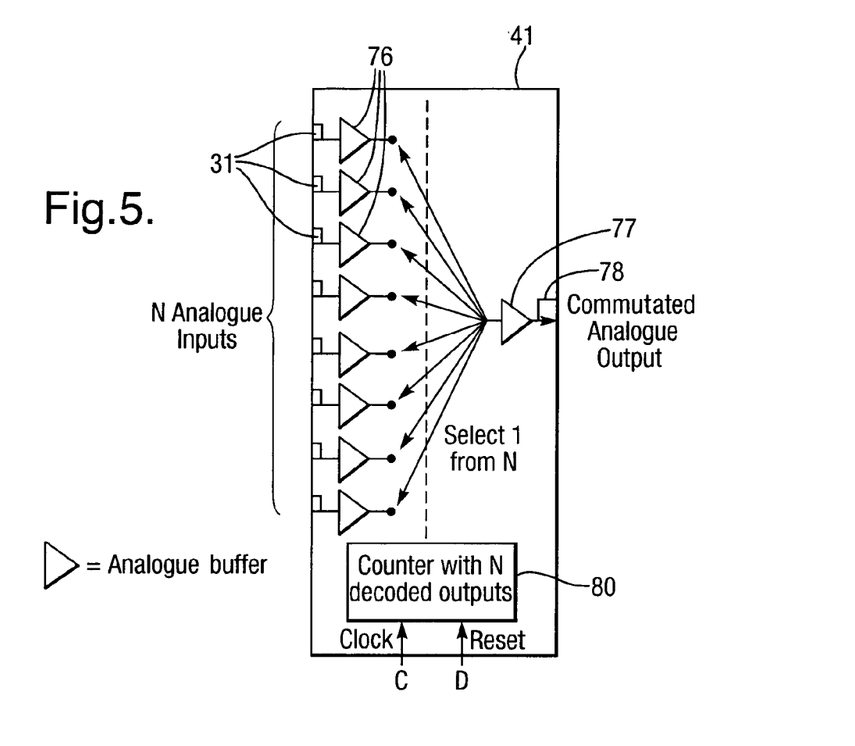
FIG. 5 shows in a commutator component of FIG. 4.

An example of an analogue commutator 41 for the PAM transmitter of FIG. 2 is shown in FIG. 5. The inputs 31 are each connected to a respective analogue buffer 76. A further analogue buffer 77 is provided at an output 78 of the commutator. The commutator shown here is a many-to-one type switch, having a counter circuit 80 which connects a selected one of the inputs to the output so as to act as an analogue multiplexer. For the PAM receiver of FIG. 3, the commutator 62 is a corresponding device which acts as a one-to-many switch for connecting the input to a selected one of the outputs so as to demultiplex the multiplexed signal.

Figure 6:
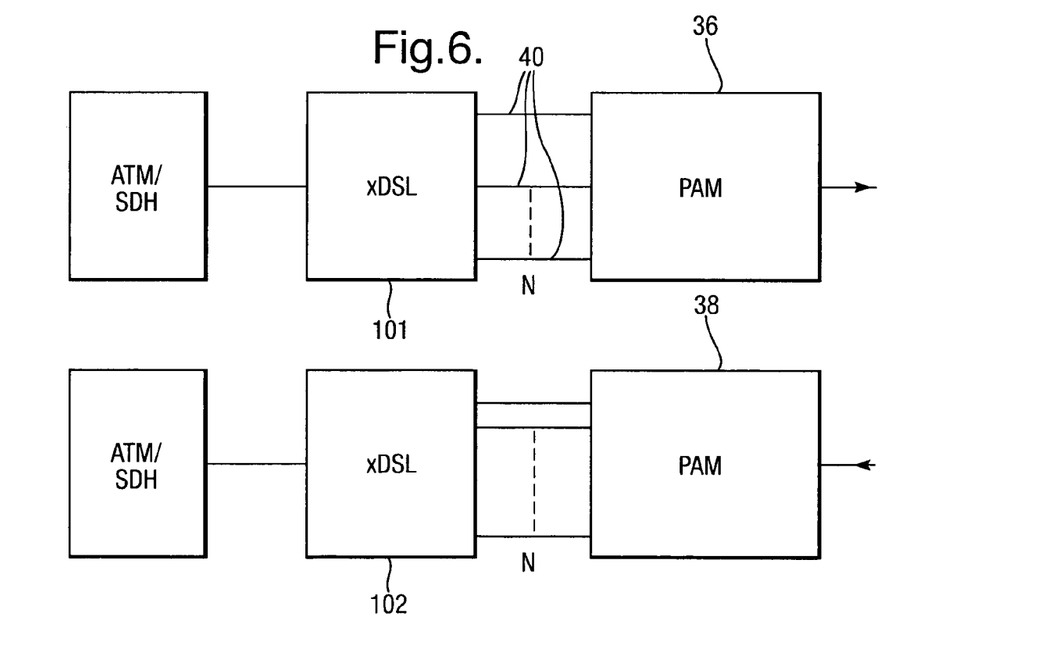
FIG. 6 shows in more detail a multiplexing/depmultiplexing arrangement at the central office of FIG. 1.

A possible arrangement for the PAM transmitter 36 and receiver 38 of the central office is shown in FIG. 6. ATM or SDH equipment at (or before) the exchange provides signals for the different customer modems 14 multiplexed in a conventional digital fashion onto a carrier (other technologies such as Ethernet could be use instead of ATM/SDH). As the ATM/SDH multiplexed signal is not suitable for transmission over the copper pairs leading to the customer modems, xDSL modulator equipment 101 provides a plurality of DSL-modulated channels 40, (each one over a different electrical link in this example). These channels are then multiplexed and transmitted over the optical link 18 by the PAM transmitter. For xDSL multiplexed channels arriving at the central office (multiplexed by the PAM transmitter at the cabinet), the PAM receiver 38 demultiplexes these channels and passes them over a respective electrical link to xDSL demodulator equipment 102, which passes the signals to ATM/SDH equipment for onward transmission over the backhaul network. Although in FIG. 6 separate fibres are shown for each direction, a single fibre could be used for both directions, in which case a coupler would be used as in FIG. 1. The xDSL modulator/demodulator equipment 101,102 may be referred together as a DSLAM.

Figure 7:
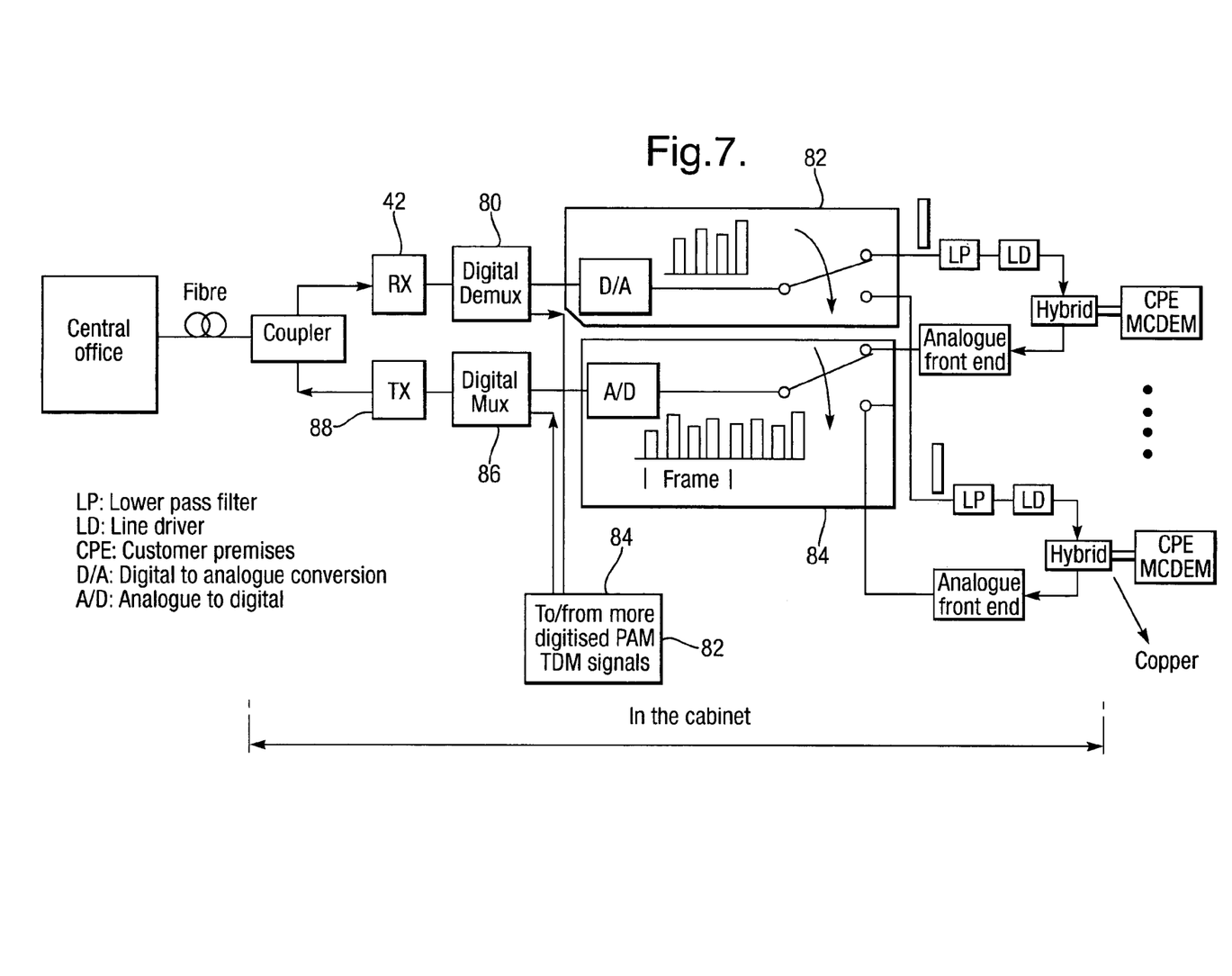
FIG. 7 shows a layered multiplexing arrangement.

FIG. 7 shows how a layered multiplexing approach may be implemented on the basis of the system shown in FIG. 1. Here, signals intended for a plurality of PAM demultiplexers are digitally multiplexed at the central office before being carried over the optical fibre 18. At the cabinet, the signals are converted into the electrical domain by a receiver 42, and are then demultiplexed by a digital demultiplexer 80. This passes the digitally demultiplexed signals to each respective PAM demultiplexer, where the digital signal is converted to an analogue signal, before being further demultiplexed by a commutator switch as in the system of FIG. 1. Each PAM demultiplexer servers a respective group of customer modems. A plurality of PAM multiplexers 84 are provided, each PAM multiplexers 84 multiplexing the analogue signals from a respective group of customer modems. The signals from each PAM multiplexers are digitised by a respective A/D unit, and digitally multiplexed by a digital multiplexer 86 before being converted into optical signals by a transmitter 88 for transmission over the optical fibre 18. At the central office, a corresponding layerd demutuplexing system similar to the downstream system of the cabinet is provided for demultiplexing the signals.

The modulator equipment 101 at the exchange or central office shown in FIG. 6 will include a digital to analogue (D to A) converter for converting digital signals into an analogue form as part of the process in generating analogue-like DSL signals for transmission downstream over the optical fibre 18 (and then in the electrical domain over the twisted pairs 20). The customer modems will each have an analogue to digital (A to D) converter for converting the received analogue signals into digital form (the customer modems need not be terminals, and could instead forward traffic to one or more further destinations in digital form). Likewise, if the customer modems are configured to transmit DSL signals in the upstream direction, the customer modems will each have a D to A converter for use when generating DSL signals for transmission to the central office. The xDSL demodulator equipment of FIG. 6 will correspondingly have an A to D converter for converting the received DSL signals into digital form.

The flowing comments can be made with regard to DSL.

There are many types of DSL line code. Whilst international standards bodies currently favour DMT (Discrete Multi Tone), it is still common to find reference to QAM (Quadrature Amplitude Modulation) and CAP (carrierless Amplitude and Phase modulation).

QAM/CAP: The signal can be shifted in frequency, using a carrier. This doubles the system bandwidth, but it also allows the use of two orthogonal carriers so that two separate streams can be transmitted in the same bandwidth. QAM uses sine and cosine waves as the two carriers. This can be viewed as the two pulse amplitudes being carried on one complex carrier. It is usual to suppress the carrier and then encode the QAM pulse amplitudes differentially. In the CAP scheme the 'complex carrier' is based on a Hilbert transform pair -but results in a similar transmission spectrum.

DMT: DMT divides the entire signal band into many sub-channels, spaced about 4.3125 KHz apart. The total data are carried by the multiple sub-channels or carriers. For each sub-channel, QAM is used to modulate the data onto the individual carrier/tone. Thus, DMT can be considered as a large number (many 100's) of independent QAM systems operating on carriers that are closely packed. The carriers are multiples of a fundamental frequency such that the QAM channels are truly orthogonal (independent). Thus, tones can be turned on or off as necessary in order give the best overall system performance and spectral shaping in order to reduce interference.

In the time domain, the signal appears as a series of adjoining periods. In each period, every tone in use produces a tone burst which lasts for the period. Each tone burst is modulated with a complex number (i.e., two signals). The resulting time domain signal is the sum of all of these modulated tone bursts and will appear almost like a noise waveform.

Thus, QAM can be regarded as single carrier modulation, which is also referred to as QAM (Quadrature Amplitude modulation), and multi carrier modulation, which is usually referred to as DMT (discrete multi tone).

The following comments explain why a DSL signal can be regarded as an analogue signal (at least as far as the operation of the PAM receivers/transmitters is concerned) despite the fact that digital information is contained within it.

To see the digital nature of a DSL signal, one has to switch to the frequency domain, where the finite number of phase and amplitude states of the QAM carriers which are superposed to create the DMT signal becomes apparent. However, the PAM receivers/transmitters do not multiplex/demultiplex the DSL signals in the frequency domain, but rather in the time domain. In the time domain, essentially the DSL signal has the appearance of a noise signal, with no visible quantisation structure: that is, the signal can take a substantially continuous range of values. It has an amplitude distribution function which is a near perfect Gaussian, although practical realisations limit the peak-to-RMS ratio to approximately 5.

Essentially, a DSL signal can be viewed as a superposition of a plurality of tones, for example quadrature amplitude modulated signals (quadrature amplitude modulation is a modulation scheme which conveys data by changing the amplitude of two carrier waves. These two carriers, usually sinusoids with same frequency, are out of phase with each other by 90 degrees).

Each carrier/tone will carry a few bits up to 15 bits per tone. For example, 10 bits corresponds to 1024 different states (using both amplitude levels and phase values, e.g. 32 amplitudes and 32 different phase values). 15 bits gives 32768 different states, 4 bits only have 16 states etc. For each carrier, it can be in one of its possible states, so if we look at two carriers both having 10 bits/tone, the combination of their different states is 1024×1024, for DMT we have many 100's of the tones, thus for the total DMT signal, combination of the different states are almost countless.

However, in the DSL MODEM this frequency domain signal is transformed into the time domain by inverse FFT. All the encoding and processing etc. in the MODEM are done digitally except the last step, i.e. the D to A conversion by the D to A converter, thus the signal coming out of the MODEM is an analogue signal despite the fact that the steps before the D to A conversion involve digital bits. So the signal which is seen by the PAM is an analogue signal (although in practice D to A conversion is normally not perfect, and some insignificantly small quantisation will normally be present in the analogue signal from a D to A converter).

The PAM system of the embodiments described above is arranged to sample the line-coded output signals from any of the above DSL systems at a rate that is at least twice as fast as the highest useful frequency component. In our case, we time division multiplex (TDM) the resulting PAM signals and use this signal to modulate a light source.

One advantage of PAM is that is requires a low power, reducing the need for local power feeding to the cabinet (intermediate node), allowing the power for the PAM to be carried from the customer modems or the exchange (or both) over ordinary telephone lines (eg the twisted pairs leading to customer premises).

Generally, the central office will be coupled to a plurality of transmitters (which may be distributed over a number of cabinets), although only one PAM transmitter 30 is shown in FIG. 1 for clarity.

Figure 8:
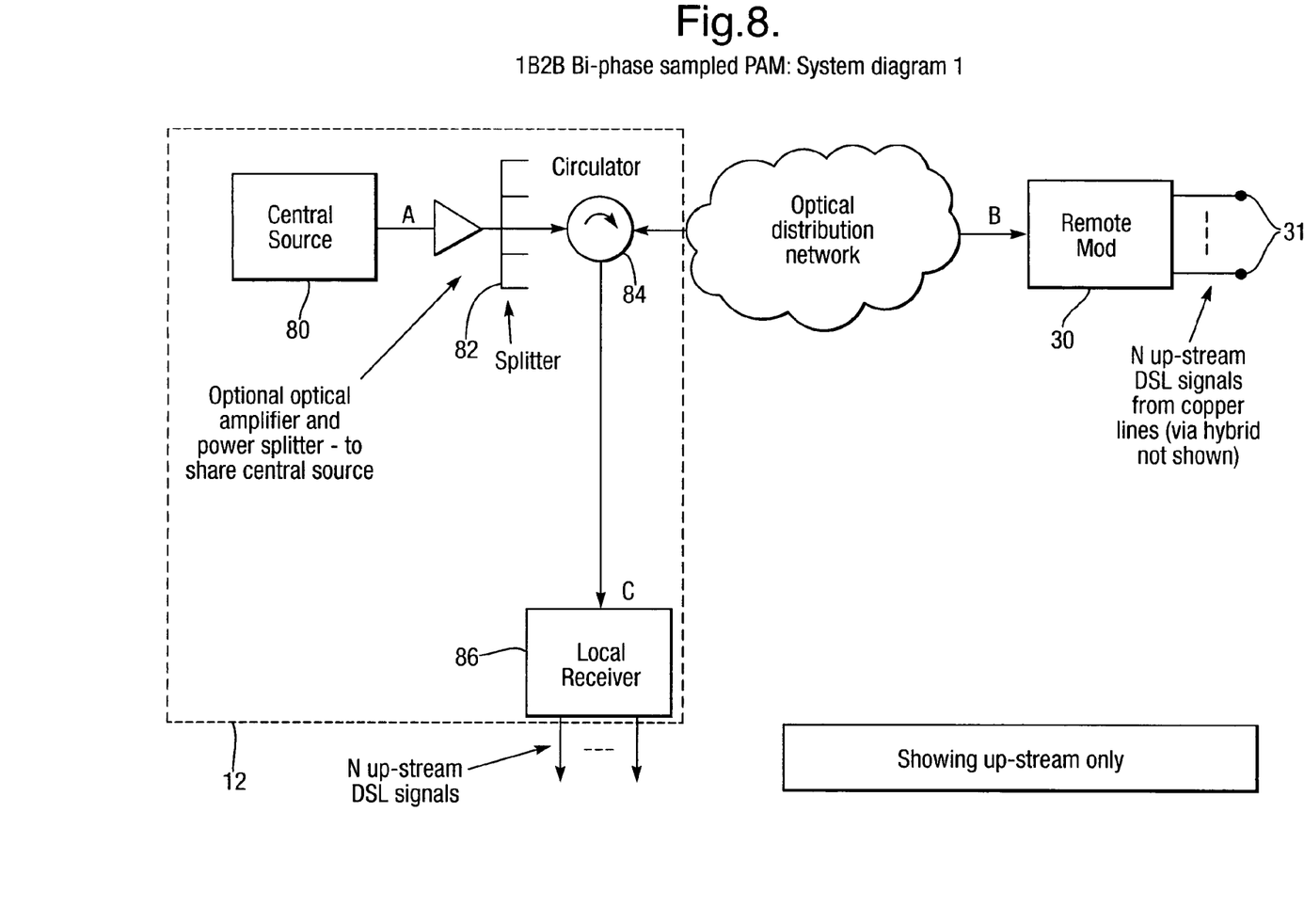
FIG. 8 shows a further embodiment for carrying upstream data.

In one embodiment for upstream traffic shown in FIG. 8, rather than a laser source being provided at each PAM transmitter, a central optical source 80 is provided at the central office (in FIG. 8, components corresponding to those of the preceding figures have corresponding numerals, and function in a corresponding fashion except where it is explicitly indicated or where it is clear from the context that a component functions differently).

Figure 9:
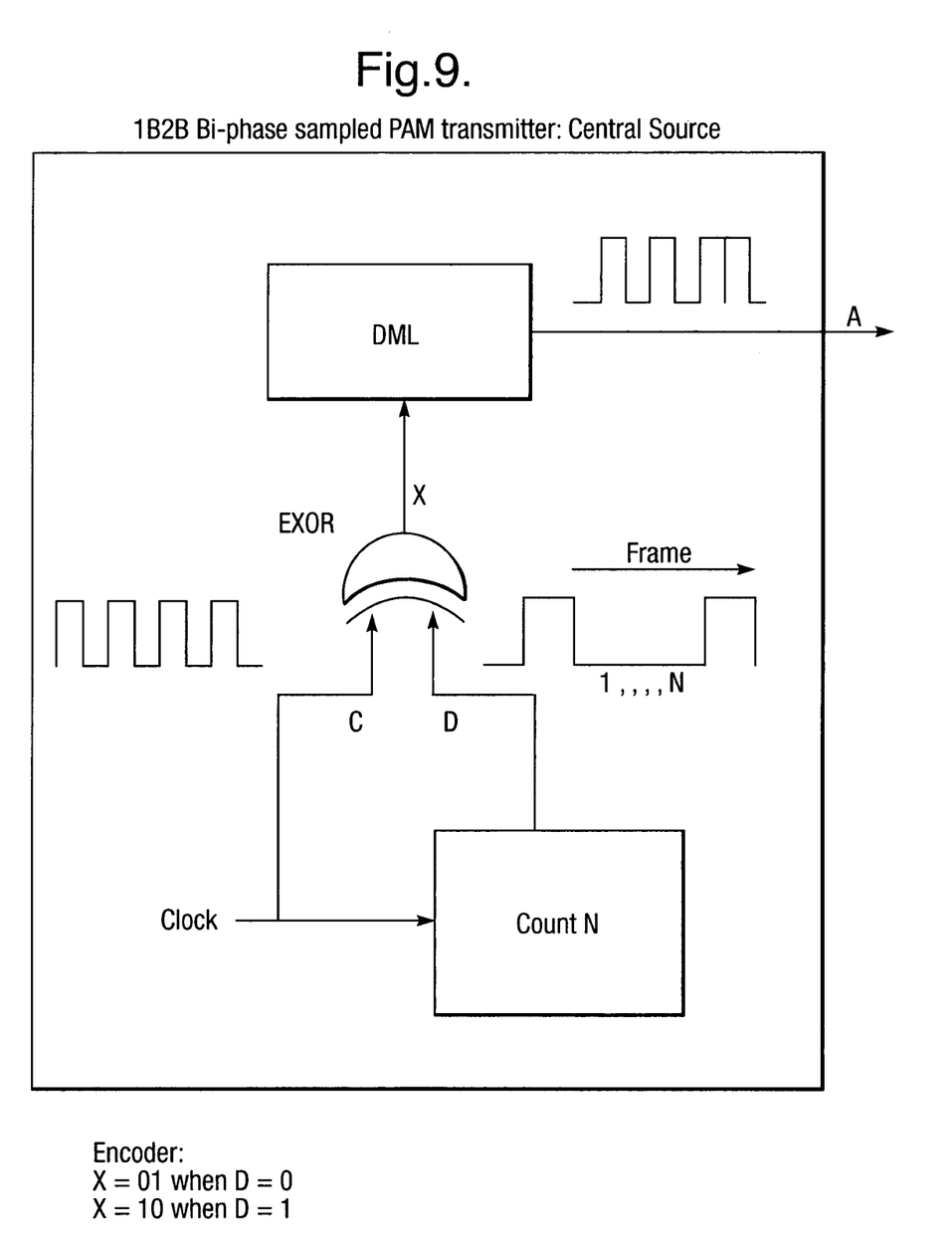
FIG. 9 shows details of the embodiment of FIG. 8.

The central source 80 is shown in more detail in FIG. 9. Essentially, the central source is formed by a synchronisation circuit 49 as in FIG. 2, which is coupled to a DML laser 42. As a result, the central source 80 provides the synchronisation signal 56 in the same manner as explained above. A splitter 82 is provided for splitting the light from the central source so the synchronisation signal can be fed to a plurality of remote modulators 30.

Considering the situation in FIG. 8 where only one remote modulator is shown for clarity, the remote modulator arranged to: multiplex upstream channels and modulate the resulting aggregate (TDM multiplexed) signal onto the synchronisation signal; and, return the modulated signal to a receiver 86 at the central office. A circulator 84 is provided for directing the light from the central source to a remote modulator, and for directing the modulated light from that remote modulator to the the respective receiver 86. The receiver 86 is arranged as show in FIG. 3 with regard to the preceding embodiments and acts to demultiplex the received multiplexed signal in a similar manner.

Figure 10:
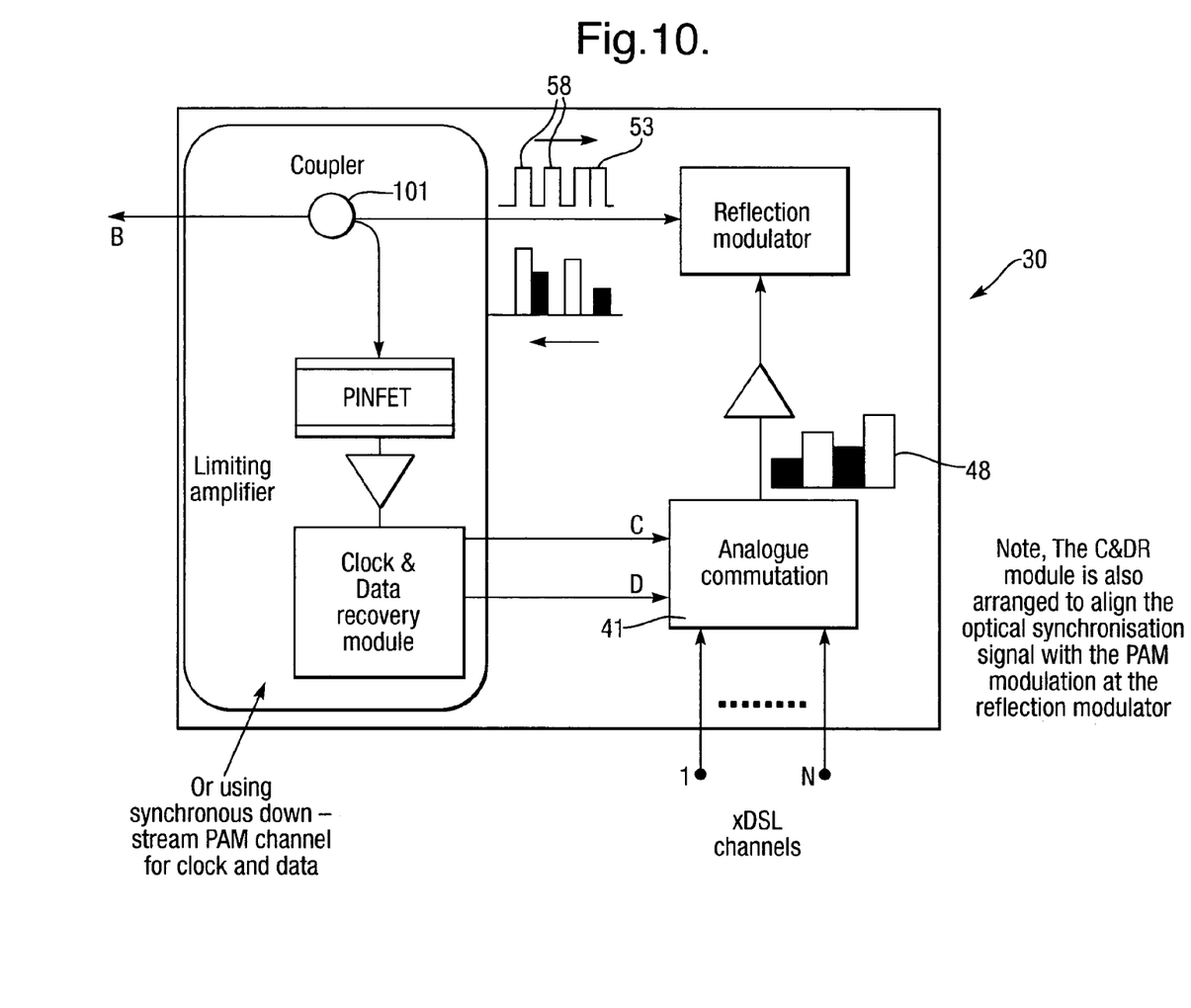
FIG. 10 shows further details of the embodiment of FIG. 8.

The remote modulator is shown in more detail in FIG. 10. As in the transmitter of FIG. 1, the remote modulator include an analogue commutator 41, which has a plurality of inputs 31, each one of which is connected to a respective customer modem (not shown). The analogue commutator 41 functions to multiplex the data from the customer modems so as to provide an aggregate signal which is modulated onto the synchronisation signal 56 in a similar manner to that described above with respect to FIG. 2. However, in the present embodiment, a reflection modulator 44 having a reflective surface is employed, so are so reflect the modulated signal back to the central office. The reflection modulator could be formed from a semiconductor optical amplifier to reduce losses.

Since the synchronisation signal is not formed locally, the clock signal (C) and the re-set signal (D) for the commutator 41 are extracted from the synchronisation signal 56 using a clock and data recovery module 64 which functions in a similar fashion to that of FIG. 3. The synchronisation signal is fed to the clock and data recovery module 64 by tapping off a portion of the received synchronisation signal using a coupler 101, which is converted to the electrical domain using a PINFET as in FIG. 3.

In the embodiment of FIG. 8, the PAM transmitter of FIG. 1 can be viewed as being distributed between the central office and the cabinet, in that the synchronisation signal, instead of being generated at the cabinet, is generated at the central station, whilst in common with the embodiment of FIG. 1, modulation of the synchronisation signal and the multiplexing of the data channels from the respective customer modems is carried out at the cabinet. In summary, the synchronisation signal from the central source is carried to circulator, where it is directed towards a remote modulator over an optical network. At the remote modulator, the synchronisation signal has modulated thereon multiplexed data from a plurality of customer modems, and is subsequently directed back over the optical network and towards the circulator. At the circulator, the multiplexed data is directed to the receiver, where it is demultiplexed.

In a situation where the central source is used to feed a plurality of remote modulators, a respective receiver will be provided for demultiplexing the signal from each remote modulator. A respective circulator will likewise be provided, one connected to each branch of the splitter, so that light from a remote modulator is directed to the receiver associated therewith, and light from the central source is directed to that modulator. An optical distribution network is provided to connect the remote modulators to the central office, as opposed to a single optical link. Some or all of the different remote modulators may be located in different cabinets that are spatial distributed with respect to one another. For example, the cabinets may be located in different streets.

Figure 11:
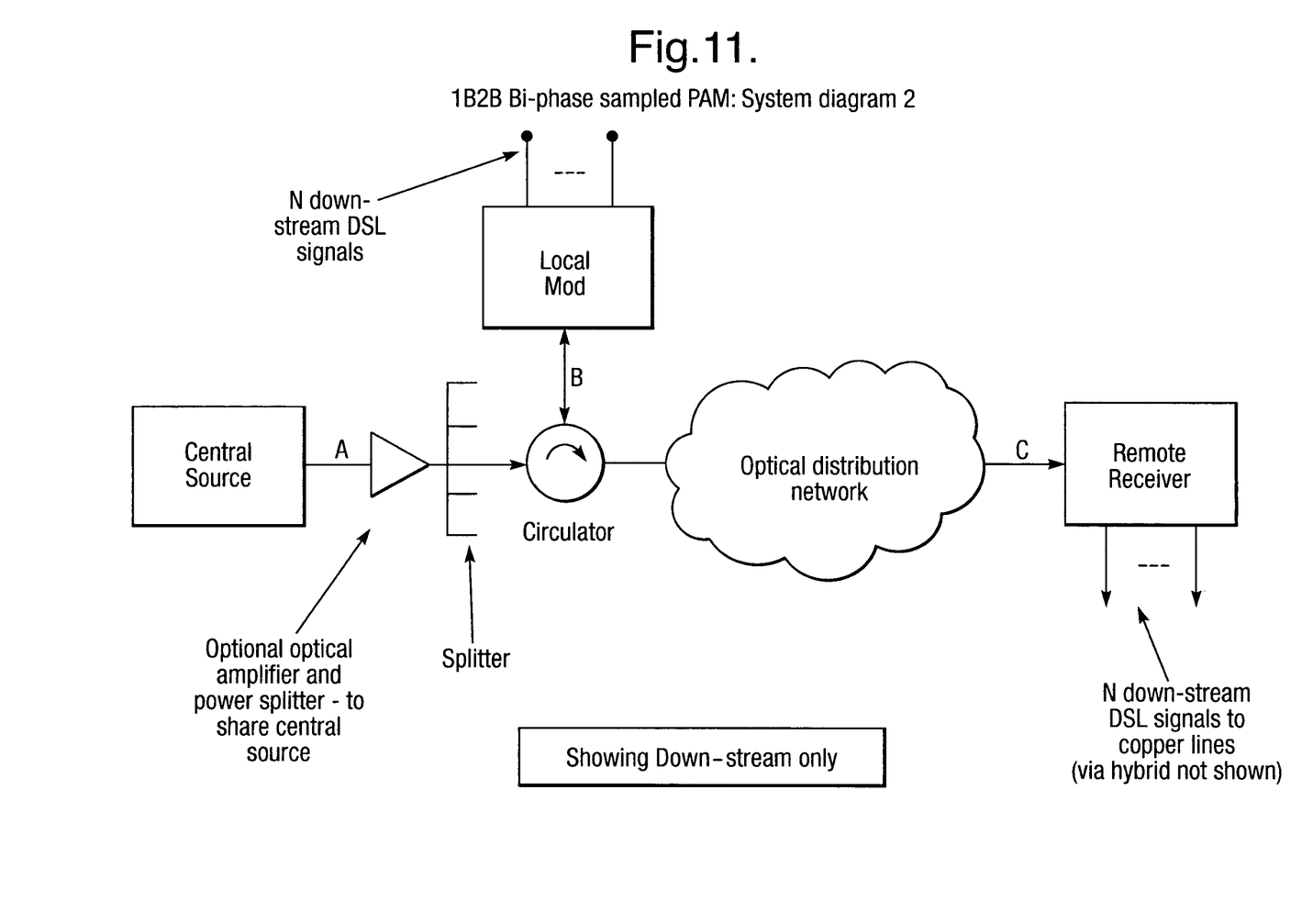
FIG. 11 shows a further embodiment of carrying downstream data

FIG. 11 shows a downstream arrangement in which a central source is employed in carrying downstream traffic (the central source and receiver correspond to those of FIG. 8, whilst the modulator corresponds to the remote modulator of FIG. 8). Here, the synchronisation signal from the central source is carried to a modulator (preferably but not necessarily located in the central office), where it is modulated with multiplexed data. The multiplexed data is then returned to the circulator, where it is directed over the optical network towards the receiver for demultiplexing. As in FIG. 8, only one set of receiver, modulator and circulator is shown. However the central source may be connected to a splitter for splitting the signal such that the signal can be fed to a plurality of respective sets of receiver, modulator and circulator, each arranged as shown in FIG. 11.

Figure 12:
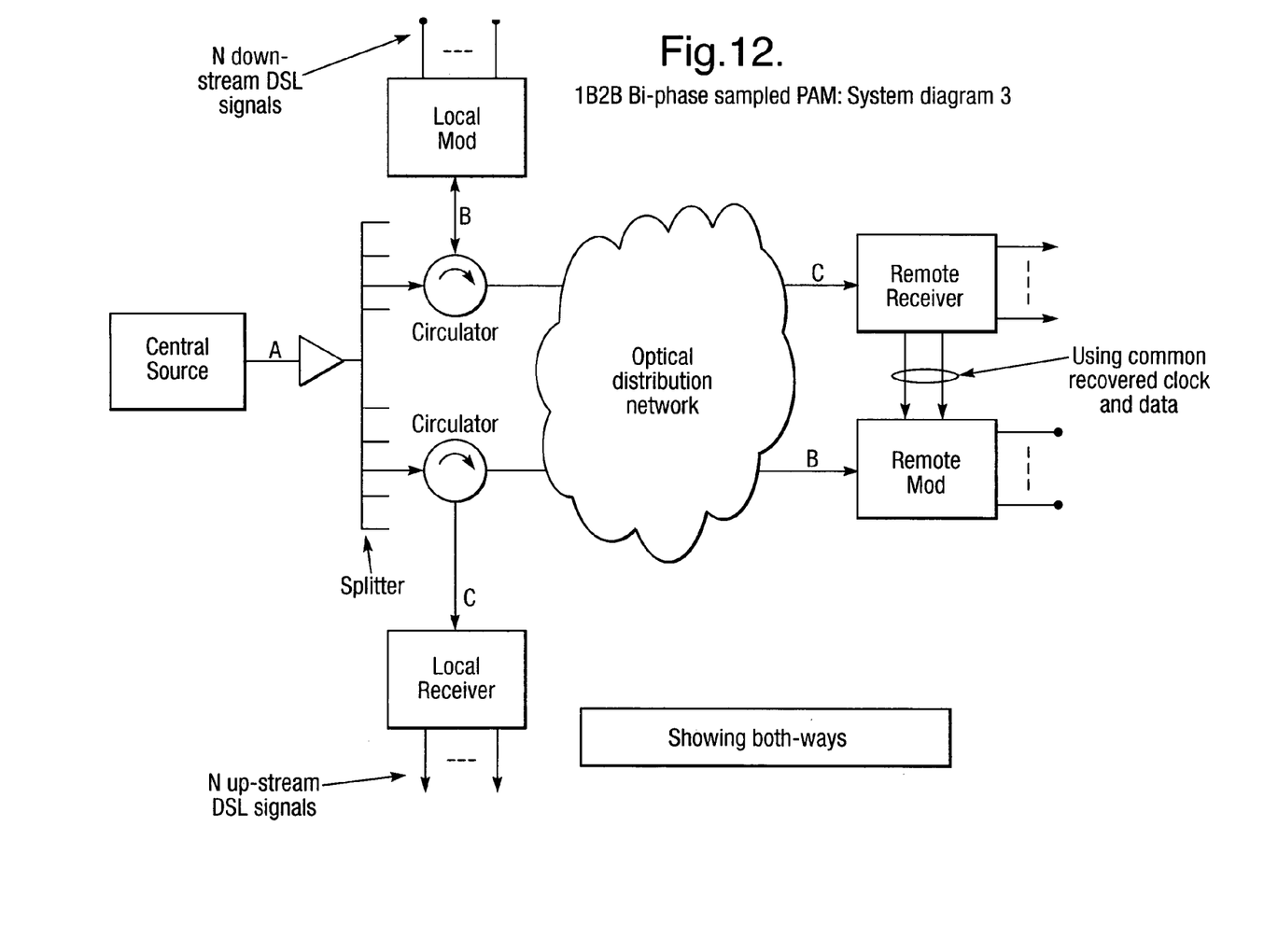
FIG. 12 shows a further embodiment of carrying downstream data and upstream data.

In FIG. 12, there is shown a combined arrangement in which a system for carrying data upstream and downstream is shown. Essentially, the respective upstream and downstream arrangements of FIGS. 8 and 11 are combined such that each are fed by a common central source, a common splitter arrangement being used to feed light from the common source to each of the upstream and downstream arrangements. In the downstream arrangement, a local modulator is located at the central office, whilst a remote receiver is located a cabinet. In the downstream arrangement, a local receiver is located at the central office, whilst a remote modulator is located a cabinet. Again, only one set of modulator, receivers, and remote modulator is shown for clarity. Because the remote receiver and modulator are each supplied with a common synchronisation signal, a clock and data recovery module is not needed in the remote modulator, and the clock and reset signals C,D may be supplied to the remote analogue commutator from the clock and data recovery of the remote receiver. Thus a common clock and data recovery module may be used for the remote receiver and modulator. This will be particularly convenient if the remote receiver and modulator are located in the same cabinet.

The local modulator and receiver need not be located at the central station, but may instead be supplied by an optical link. Clearly, the use of a common source allows cost savings, in particular if a high quality, low noise source is used, since it is shared between a plurality of PAM transmitters (modulators) and/or cabinets.

The invention claimed is:

1. A method of communicating with a plurality of devices, each of which is to receive a signal whose amplitude varies in an analogue fashion, the method including the steps of:
   temporally interleaving the signals for the respective devices so as to form a multiplexed signal having a plurality of sequential pulses arranged in a frame structure, which pulses can, in an analogue fashion,
   each take an amplitude value within a continuous range; and
   forming a synchronisation signal within the multiplexed signal for subsequently demultiplexing the multiplexed signal, the synchronisation signal being formed by reducing the amplitude within a temporal portion of at least some of the pulses,
   wherein the position of the or each reduced amplitude portion within a given pulse is altered in some of the pulses, the pulses within which the position is altered occurring in a cyclic manner, and wherein a pulse within which the position of the reduced amplitude portion is altered indicates a beginning of a frame.

2. A method as claimed in claim 1, wherein the amplitude of a temporal portion of at least some of the pulses is reduced substantially to zero.

3. A method as claimed in claim 1, wherein the synchronisation signal includes a clock signal.

4. A method as claimed in claim 1, wherein the signals for each device include data modulated using an xDSL modem, so as to form a respective xDSL channel, the xDSL channels being multiplexed together so as to form the multiplexed signal.

5. A method as claimed in claim 1, wherein the multiplexed signal is demultiplexed at an intermediate node, the demultiplexed signal from the intermediate node being fed to the each device by a respective twisted pair of electrical wires, and wherein the multiplexed signal is transmitted from an exchange along an optical link.

6. A method as claimed in claim 1, wherein an analogue commutator switch is used to temporally interleave the signals for the devices.

7. A method as claimed in claim 1, wherein the amplitude within a temporal portion of at least some of the pulses is reduced by modulating one of the synchronisation signal and the multiplexed signal onto the other of the synchronisation signal and the multiplexed signal.

8. A method as claimed in claim 7, wherein the synchronisation signal is received from a location that is remote from the location at which modulation occurs.

9. A method as claimed in claim 8, wherein the modulated signal is returned towards the remote location.

10. A method as claimed in claim 1, wherein there is provided an upstream arrangement for carrying upstream data, and a downstream arrangement for carrying downstream data, and wherein each use a synchronisation signal provided by a common source.

11. A multiplexer circuit for temporally interleaving analogue-like data signals so as to form a multiplexed signal having a plurality of sequential pulses arranged in a frame structure, which pulses can, in an analogue fashion, each have an amplitude within a continuous range, wherein
the multiplexer circuit has a synchronisation circuit arranged in use to form a synchronisation signal within the multiplexed signal to allow for the subsequently demultiplexing of the multiplexed signal, the synchronisation circuit having a configuration to reduce the amplitude within a temporal portion of at least some of the pulses so as to form the synchronisation signal, wherein
the position of the or each reduced amplitude portion within a given pulse is altered in some of the pulses, the pulses within which the position is altered occurring in a cyclic manner, and
wherein a pulse within which the position of the reduced amplitude portion is altered indicates a beginning of a frame.

12. A communication network including a multiplexer circuit as claimed in claim 11, the communication network having:
a communications station;
a plurality of communication devices;
an intermediate node located between an exchange and user terminations;
an optical link connecting the exchange to the intermediate node;
electrical transmission lines connecting the intermediate node to the user terminations; and,
data transmission means for generating a respective data signal for at least some of the user terminations, each data signal having an amplitude that varies in an analogue fashion;
wherein the communications station is arranged to transmit the multiplexed signal from the multiplexer circuit over the optical link, the intermediate node having a demultiplexer circuit arranged to demultiplex the multiplexed signals and transmit each data signal to a respective communications device over a respective electrical link.

13. A method of communicating with a plurality of devices, each of which provides a signal whose amplitude varies in an analogue fashion, the method including the steps of:
temporally interleaving the signals from the devices so as to form a multiplexed signal having a plurality of sequential pulses arranged in a frame structure, which pulses can, in an analogue fashion, each have an amplitude within a continuous range, each pulse originating from a respective device, and each pulse having a plurality of temporal portions; and
forming a synchronisation signal within the multiplexed signal for demultiplexing the multiplexed signal, the synchronisation signal being formed by reducing the amplitude within a temporal portion of at least some of the pulses,
wherein the position of the or each reduced amplitude portion within a given pulse is altered in some of the pulses, the pulses within which the position is altered occurring in a cyclic manner, and
wherein a pulse within which the position of the reduced amplitude portion is altered indicates a beginning of a frame.

14. A method as claimed in claim 13, wherein the multiplexed signal is formed at an intermediate node, the signal from each device being fed to the intermediate node by a respective twisted pair of electrical wires, and wherein the multiplexed signal is transmitted to an exchange along an optical link.

* * * * *

UNITED STATES PATENT AND TRADEMARK OFFICE
CERTIFICATE OF CORRECTION

PATENT NO. : 8,730,987 B2
APPLICATION NO. : 12/303439
DATED : May 20, 2014
INVENTOR(S) : Healey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this

Twenty-ninth Day of September, 2015

Michelle K. Lee
*Director of the United States Patent and Trademark Office*